United States Patent
Cho et al.

(10) Patent No.: US 9,990,036 B2
(45) Date of Patent: *Jun. 5, 2018

(54) HEAD MOUNTED DISPLAY AND METHOD FOR CONTROLLING THE SAME

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/114,022

(22) PCT Filed: May 9, 2014

(86) PCT No.: PCT/KR2014/004165
§ 371 (c)(1),
(2) Date: Jul. 25, 2016

(87) PCT Pub. No.: WO2015/126007
PCT Pub. Date: Aug. 27, 2015

(65) Prior Publication Data
US 2016/0342204 A1    Nov. 24, 2016

Related U.S. Application Data

(63) Continuation of application No. 14/254,497, filed on Apr. 16, 2014, now Pat. No. 9,239,618.

(30) Foreign Application Priority Data

Feb. 20, 2014    (KR) .................. 10-2014-0019522

(51) Int. Cl.
*G06F 3/00* (2006.01)
*G06F 3/01* (2006.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC ...... G06F 3/0487; G06F 3/013; G06F 3/1423; G06T 19/006; G06T 2200/28;
(Continued)

(56) References Cited

U.S. PATENT DOCUMENTS

2003/0020707 A1    1/2003    Kangas et al.
2011/0018862 A1    1/2011    Epps
(Continued)

FOREIGN PATENT DOCUMENTS

JP    7-67056 A    3/1995
JP    2004-62393 A    2/2004
JP    2010-97472 A    4/2010

*Primary Examiner* — Muhammad N Edun
(74) *Attorney, Agent, or Firm* — Birch, Stewart, Kolasch & Birch, LLP

(57) ABSTRACT

A head mounted display (HMD) including a display unit configured to display an augmented reality image; a communication unit configured to communicate with an external device; a gaze detection unit configured to detect a gaze of a user; and a processor configured to execute a function corresponding to the augmented reality image when the augmented reality image and the external device are aligned in a first mode. Further, the first mode is a mode in which a display position of the augmented reality image remains fixed even when a position of the external device is changed, and transmit control information for displaying an execution image of the function to the external device.

20 Claims, 9 Drawing Sheets

(51) Int. Cl.
  *G06T 19/00* (2011.01)
  *G02B 27/01* (2006.01)
  *G02B 27/00* (2006.01)
  *G06F 3/0487* (2013.01)
  *G06F 3/14* (2006.01)

(52) U.S. Cl.
  CPC .......... *G06F 3/0487* (2013.01); *G06F 3/1423* (2013.01); *G06T 19/006* (2013.01); *G02B 2027/014* (2013.01); *G02B 2027/0138* (2013.01); *G06T 2200/28* (2013.01)

(58) Field of Classification Search
  CPC ........ G02B 27/0172; G02B 2027/0138; G02B 2027/014; G02B 27/0093
  See application file for complete search history.

(56) References Cited

U.S. PATENT DOCUMENTS

| | | |
|---|---|---|
| 2012/0302289 A1 | 11/2012 | Kang |
| 2013/0083003 A1* | 4/2013 | Perez .................... G06F 3/005 345/419 |
| 2013/0128364 A1 | 5/2013 | Wheeler et al. |
| 2013/0147686 A1 | 6/2013 | Clavin et al. |
| 2014/0204002 A1 | 7/2014 | Bennet et al. |
| 2014/0282220 A1 | 9/2014 | Wantland et al. |
| 2014/0292645 A1 | 10/2014 | Tsurumi |
| 2015/0123966 A1 | 5/2015 | Newman |

* cited by examiner

[Fig. 1]
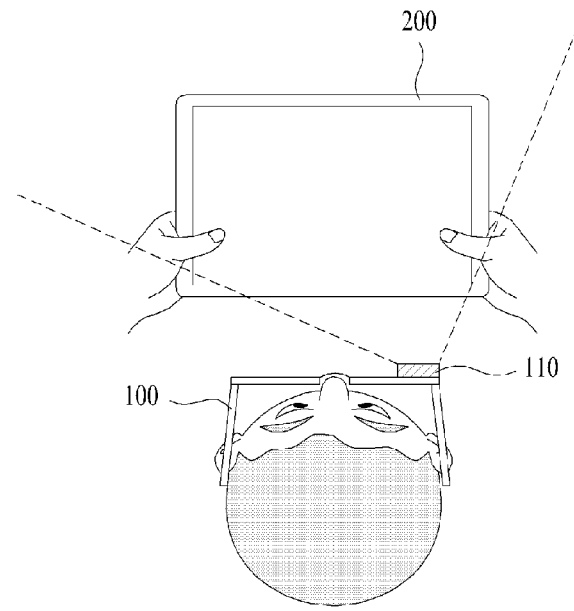
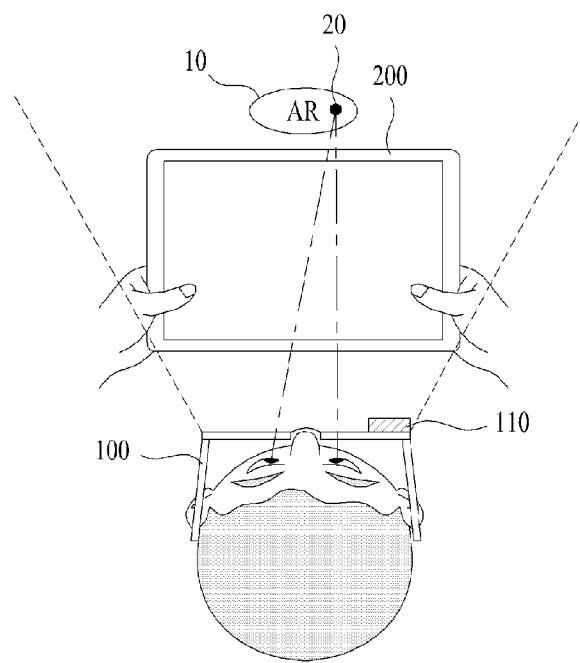

[Fig. 2]
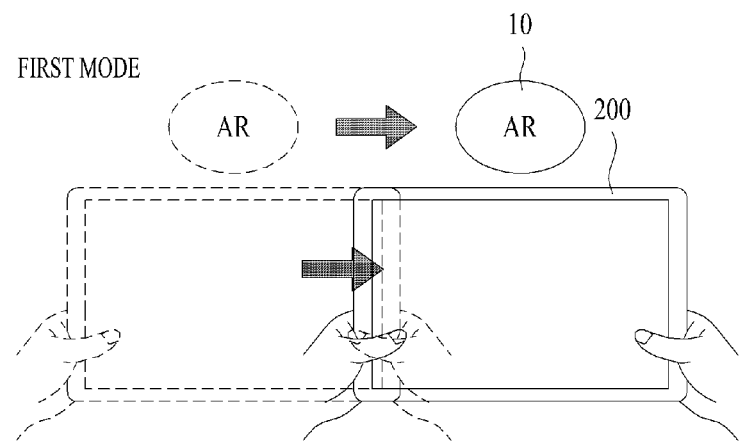
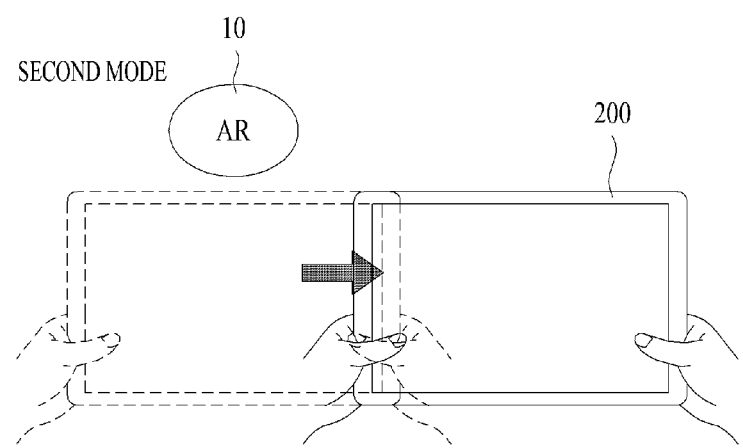

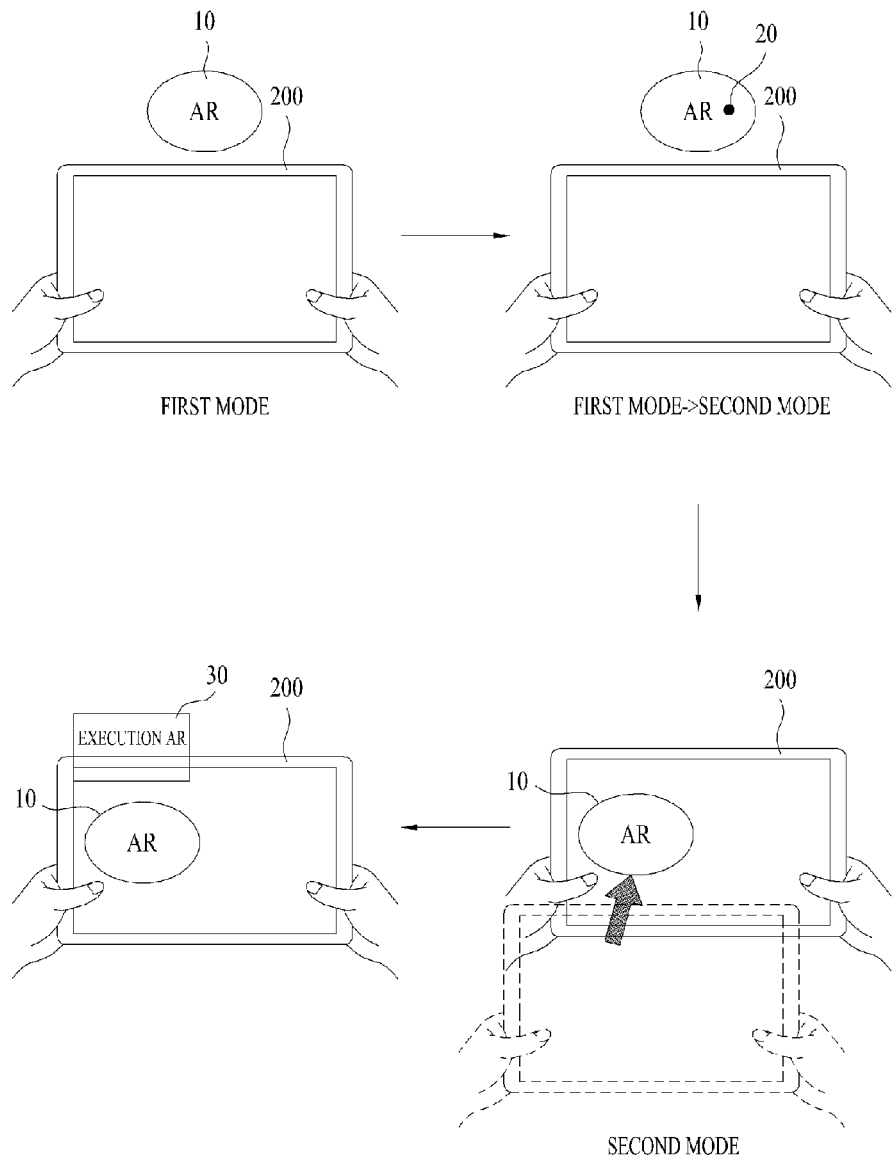
[Fig. 3]

[Fig. 4a]
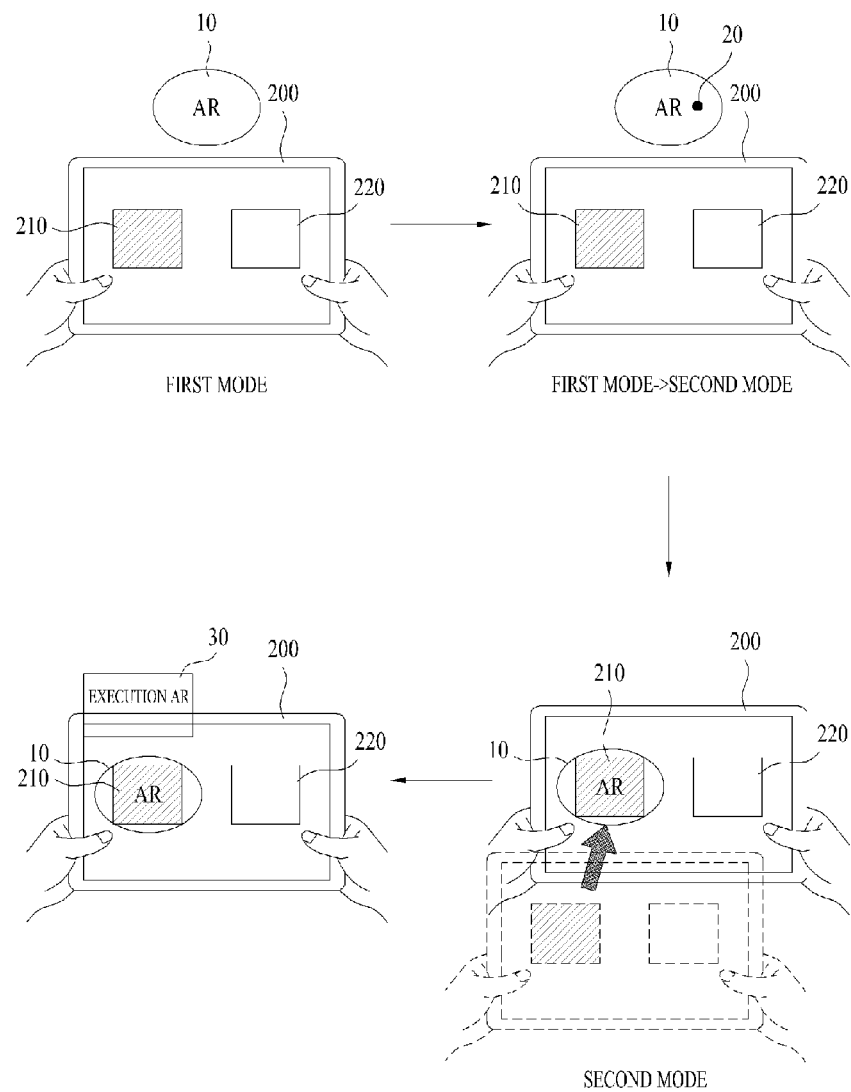

[Fig. 4b]
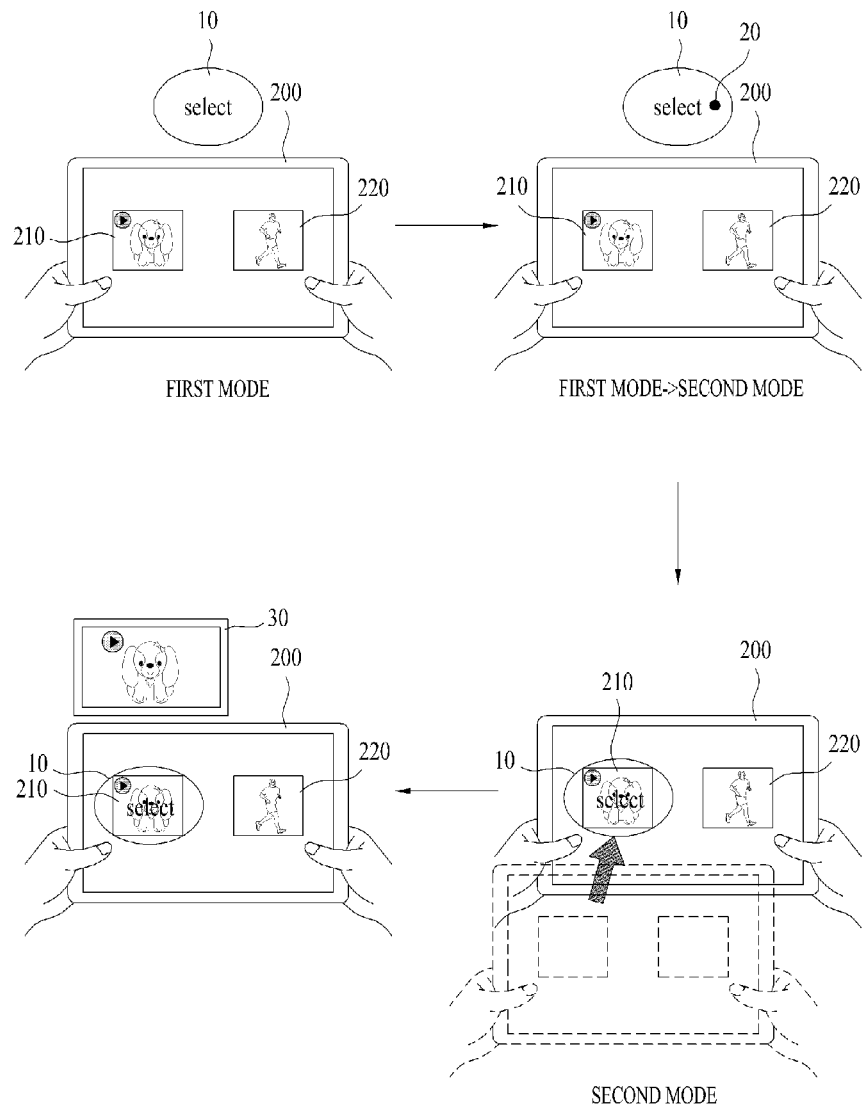

[Fig. 5]
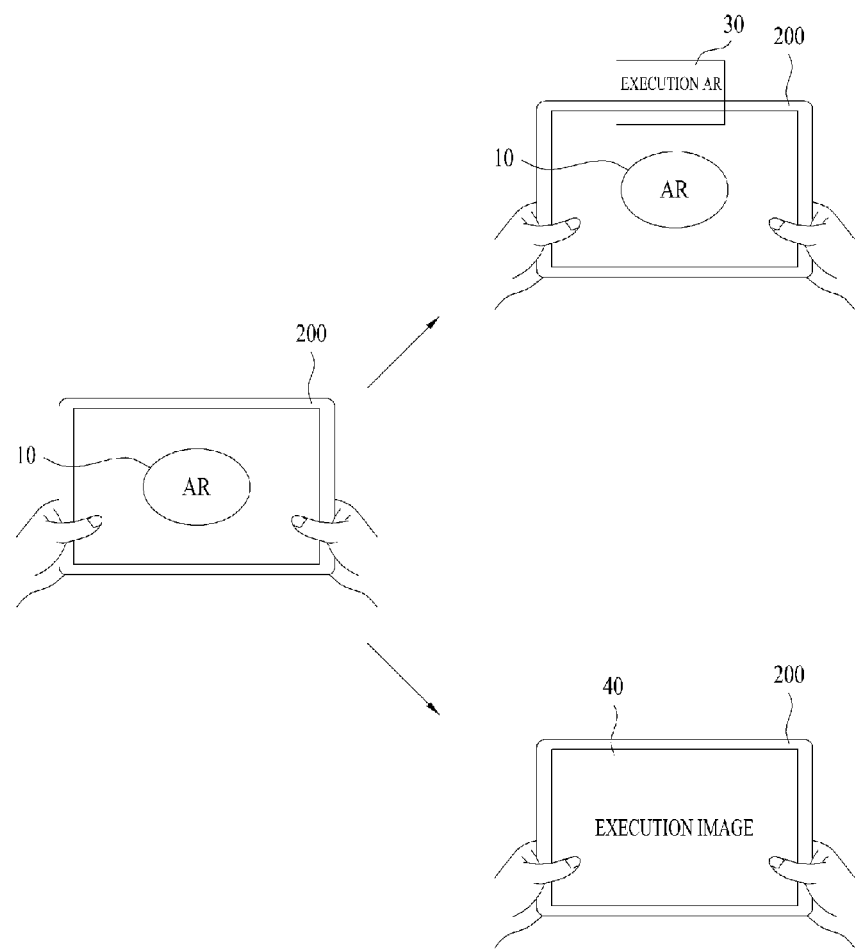

[Fig. 6]
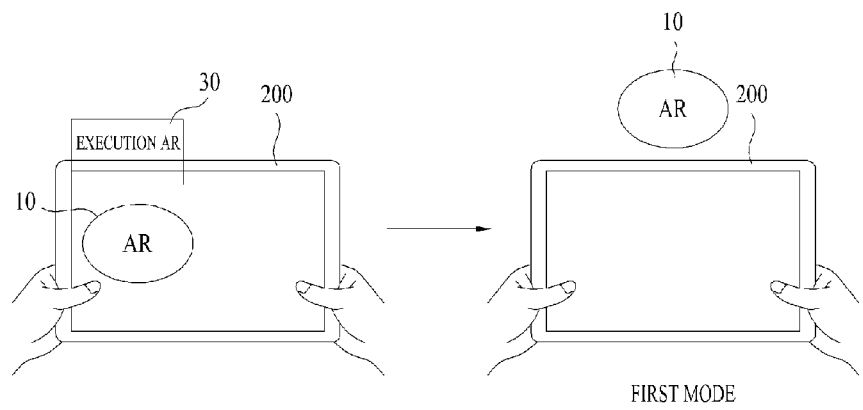
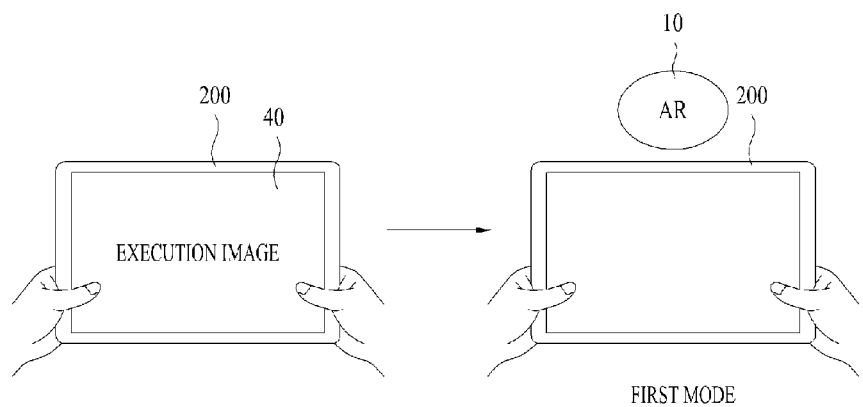

[Fig. 7]
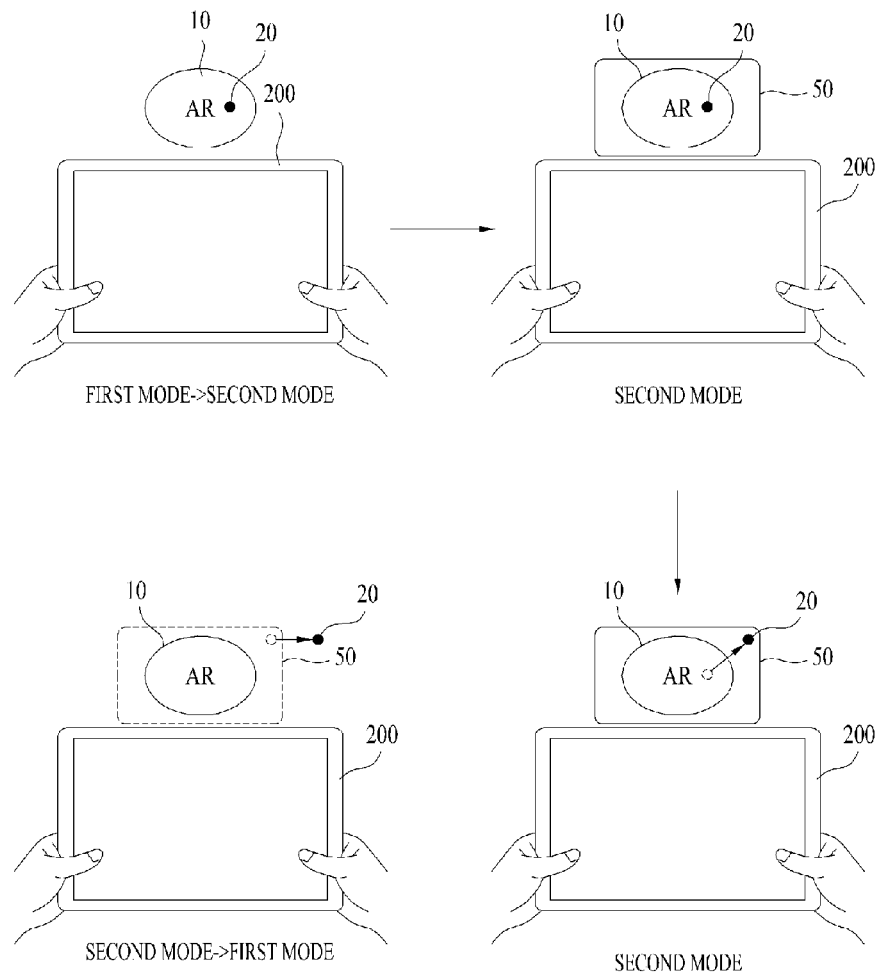
[Fig. 8]
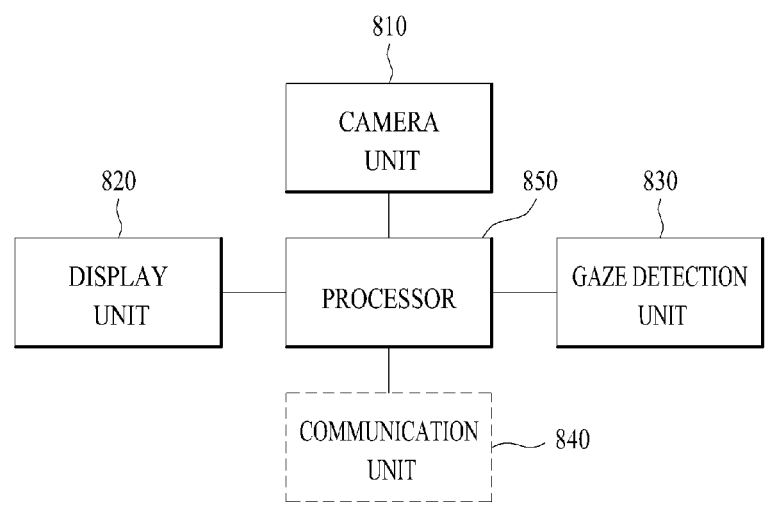

[Fig. 9]
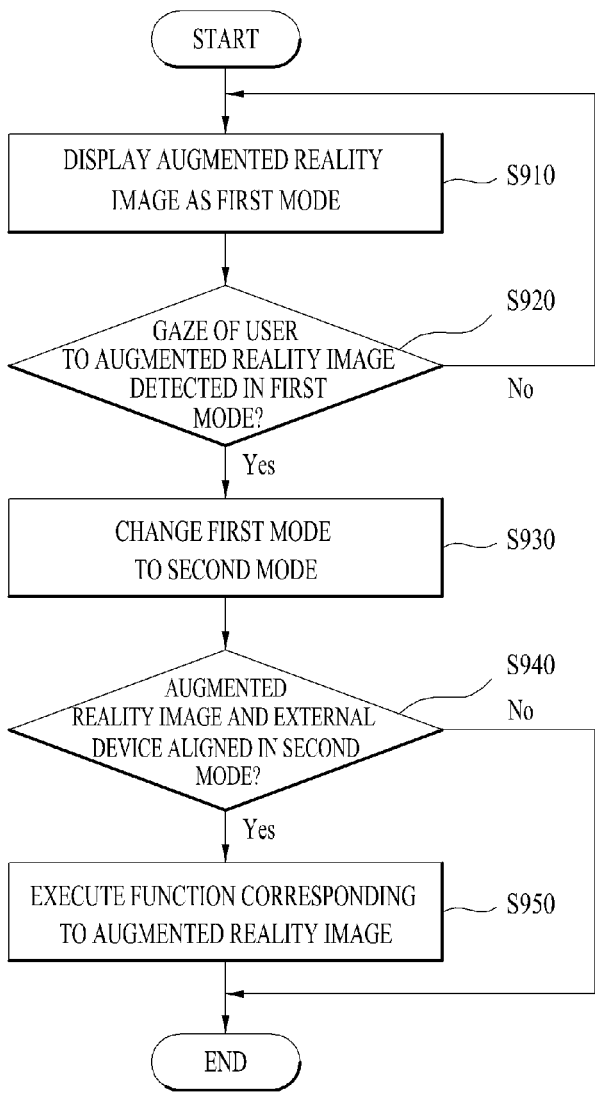

HEAD MOUNTED DISPLAY AND METHOD FOR CONTROLLING THE SAME

CROSS-REFERENCE TO RELATED APPLICATIONS

This application is the National Phase of PCT International Application No. PCT/KR2014/004165, filed May 9, 2014, which is a Continuation of U.S. application Ser. No. 14/254,497, filed on Apr. 16, 2014 (issued as U.S. Pat. No. 9,239,618 B2). This PCT application and U.S. application Ser. No. 14/254,497 claim priority under 35 U.S.C. 119(a) to Patent Application No 10-2014-0019522, filed in Republic of Korean on Feb. 20, 2014. All these applications are hereby expressly incorporated by reference into the present application.

TECHNICAL FIELD

The present specification relates to a head mounted display (HMD), and more particularly, to an HMD for displaying an augmented reality image and a method for controlling the same.

BACKGROUND ART

An augmented reality service enables a user to view a real image and an augmented reality image to provide real information and virtual information to the user. Recently, as technologies have been developed, a head mounted display (HMD) has been used as a device for providing an augmented reality service.

SUMMARY OF THE INVENTION

When an augmented reality service is provided using an HMD, there is a need for a more convenient input method for executing a function corresponding to an augmented reality image.

Accordingly, the present specification is directed to a head mounted display (HMD) and a method for controlling the same that substantially obviate one or more problems due to limitations and disadvantages of the related art.

An object of the present specification is to provide an HMD for executing a function corresponding to an augmented reality image according to alignment between an external device and an augmented reality image or alignment between a content image displayed on an external device and an augmented reality image, and a method for controlling the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mounted display (HMD) includes a camera unit configured to detect an external device, a display unit configured to display an augmented reality image, a gaze detection unit configured to detect a gaze of a user, and a processor configured to control the camera unit, the display unit and the gaze detection unit, wherein the processor is further configured to detect the external device, display the augmented reality image as a first mode, wherein the first mode is a mode in which a display position of the augmented reality image depends on a position of the external device, change the first mode to a second mode when the gaze of the user to the augmented reality image is detected in the first mode, wherein the second mode is a mode in which the display position of the augmented reality image remains fixed even when the position of the external device is changed, and execute a function corresponding to the augmented reality image when the augmented reality image and the external device are aligned in the second mode.

In another aspect of the present specification, a method for controlling a head mounted display (HMD) includes detecting an external device, displaying an augmented reality image as a first mode, wherein the first mode is a mode in which a display position of the augmented reality image depends on a position of the external device, changing the first mode to a second mode when the gaze of the user to the augmented reality image is detected in the first mode, wherein the second mode is a mode in which the display position of the augmented reality image remains fixed even when the position of the external device is changed, and executing a function corresponding to the augmented reality image when the augmented reality image and the external device are aligned in the second mode.

It is to be understood that both the foregoing general description and the following detailed description of the present specification are exemplary and explanatory and are intended to provide further explanation of the specification as claimed.

According to the present specification, a HMD may display an augmented reality image as two modes, that is, a first mode or a second mode, depending on whether the augmented reality image depends on the position of the external device.

According to the present specification, the HMD may change the first mode to the second mode or change the second mode to the first mode according to the gaze of the user to the augmented reality image.

According to the present specification, when the external device and the augmented reality image are aligned or when the content image of the external device and the augmented reality image are aligned, a function corresponding to the augmented reality image may be executed. Accordingly, the HMD may execute the function corresponding to the augmented reality image using a more convenient input method, thereby providing a user-friendly augmented reality service to the user.

BRIEF DESCRIPTION OF DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 1 is a diagram showing a method for detecting an external device and a gaze of a user and displaying an augmented reality image, at a head mounted display (HMD) according to one embodiment of the present specification;

FIG. 2 is a diagram showing a method for displaying an augmented reality image as a first mode or a second mode, at an HMD according to one embodiment of the present specification;

FIG. 3 is a diagram showing a method for executing a function corresponding to an augmented reality image according to alignment between the augmented reality image and an external device, at an HMD according to one embodiment of the present specification;

FIGS. 4a and 4b are diagrams showing a method for executing a function corresponding to an augmented reality image according to alignment between the augmented reality image and an external device, at an HMD according to another embodiment of the present specification;

FIG. 5 is a diagram showing a method for providing an execution screen of a function corresponding to an augmented reality image, at an HMD according to one embodiment of the present specification;

FIG. 6 is a diagram showing a method for displaying an augmented reality image when a function corresponding to an augmented reality image is terminated, at an HMD according to one embodiment of the present specification;

FIG. 7 is a diagram showing a method for displaying a gaze holding area, at an HMD according to one embodiment of the present specification;

FIG. 8 is a block diagram showing the configuration of an HMD according to one embodiment of the present specification; and FIG. 9 is a flowchart illustrating a method for controlling an HMD according to one embodiment of the present specification.

DETAILED DESCRIPTION OF THE EMBODIMENTS

Hereinafter, the embodiments will be described in detail with reference to the accompanying drawings. However, the present specification is not limited to the embodiments described herein.

Although the terms used in the present specification are selected from generally known and used terms, terms used herein may be varied depending upon operator's intention or customs in the art, appearance of new technology, or the like. In addition, some of the terms mentioned in the description of the present specification have been selected by the applicant at his or her discretion, the detailed meanings of which are described in relevant parts of the description herein. Furthermore, it is required that the present specification is understood, not simply by the actual terms used but by the meanings of each term lying within.

In the present specification, a head mounted display (HMD) may mean a wearable device worn on a body of a user to display visual information. For example, the HMD may be a wearable device which is worn on the head of a user to display an augmented reality image. In addition, in the present specification, the augmented reality image is a virtual image and may include graphic images, text, symbols and emoticons.

FIG. 1 is a diagram showing a method for detecting an external device and a gaze of a user and displaying an augmented reality image, at a head mounted display (HMD) according to one embodiment of the present specification.

More specifically, the upper side of FIG. 1 shows a method for, at an HMD 100, detecting an external device 200 using a camera unit 110 and the lower side of FIG. 1 shows a method for, at the HMD 100, displaying an augmented reality image 10 using a display unit and detecting a gaze 20 of a user using a gaze detection unit.

As shown in the upper side of FIG. 1, the HMD 100 may detect the external device 200 using the camera unit 110. In addition, the HMD 100 may detect position change of the external device 200 using the camera unit 110. More specifically, the HMD 100 may detect the external device 200 and position change of the external device 200 from the image captured by the camera unit 110. The external device 200 is a display device for displaying at least one content image.

As shown in the lower side of FIG. 1, the HMD 100 may display the augmented reality image 10 using the display unit. If the display unit is composed of an optical see-through display panel, the HMD 100 may display the augmented reality image 10 on the periphery of the external device 200 of the real world viewed by the user via the see-through display panel.

At this time, the HMD 100 may display the augmented reality image 10 corresponding to the external device 200. For example, the HMD 100 may display the augmented reality image 10 corresponding to a display function of the external device 200. That is, the HMD 100 may display the augmented reality image 10 corresponding to a moving image playback button of the external device 200. In addition, the HMD 100 may display the augmented reality image 10 corresponding to the HMD 100. For example, the HMD 100 may display the augmented reality image 10 corresponding to a phone function or a message transfer function of the HMD 100. The above-described embodiments are only examples of the augmented reality image 10 and the HMD 100 of the present specification is not limited by the embodiment.

As shown in the lower side of FIG. 1, the HMD 100 may detect the gaze 20 of the user using the gaze detection unit. For example, the HMD 100 may detect the gaze 20 of the user into the augmented reality image 10 using the gaze detection unit. In addition, the HMD 100 may detect position change of the gaze 20 of the user using the gaze detection unit.

FIG. 2 is a diagram showing a method for displaying an augmented reality image as a first mode or a second mode, at an HMD according to one embodiment of the present specification.

As shown in the upper side of FIG. 2, the HMD may display the augmented reality image 10 as the first mode. The first mode may mean a mode in which the display position of the augmented reality image 10 depends on the position of the external device 200. That is, in the first mode, when the position of the external device 200 is changed, the display position of the augmented reality image 10 is changed based on the changed position of the external device 200. For example, as shown in the upper side of FIG. 2, when the position of the external device 200 is changed from the left to the right, the HMD may change the position of the augmented reality image 10 displayed as the first mode from the left to the right based on the changed position of the external device 200. Accordingly, the HMD may provide a user with the augmented reality image 20 is tied with the external device 200 and moved together with the external device 200.

As shown in the lower side of FIG. 2, the HMD may display the augmented reality image 10 as the second mode. The second mode may mean a mode in which the display position of the augmented reality image 10 remains fixed even when the position of the external device 200 is changed. For example, as shown in the lower side of FIG. 2, even when the position of the external device 200 is changed from the left to the right, the HMD may fix the display position of the augmented reality image 10. The HMD may provide a user with the augmented reality image 10 which is independent of the external device 200. That is, the HMD may provide a user with the augmented reality image 10 is not tied with the external device 200.

At this time, the HMD may fix the augmented reality image displayed as the second mode in a display area of the HMD. That is, the HMD may fix the augmented reality image 10 displayed as the second mode at a specific position of the display area of the HMD (e.g., specific coordinates of the display unit). In this case, a user who wears the HMD can continuously view the augmented reality image 20 at a specific position of the display area of the HMD even when the position of the HMD is changed. In addition, the HMD may fix the augmented reality image 10 displayed as the second mode in a peripheral space of the HMD. That is, the HMD may fix the augmented reality image 10 displayed as the second mode at a specific position of a peripheral space of the HMD (e.g., specific coordinates of the space). In this case, a user who wears the HMD may not continuously view the augmented reality image 10 when the position of the HMD is changed while viewing the augmented reality image 20 but may view the augmented reality image 10 again when the HMD is returned to the original position.

FIG. 3 is a diagram showing a method for executing a function corresponding to an augmented reality image according to alignment between the augmented reality image and an external device, at an HMD according to one embodiment of the present specification.

As shown in the left upper side of FIG. 3, the HMD may display the augmented reality image 10 as the first mode. For example, as shown, the HMD may display the augmented reality image 10 on the periphery of the upper end of the external device 200 as the first mode. When the external device 200 is detected, the HMD may display the augmented reality image 10 as the first mode. In addition, when the gaze 20 of the user to the external device 200 is detected, the HMD may display the augmented reality image 10 as the first mode.

As shown in the right upper side of FIG. 3, when the gaze 20 of the user to the augmented reality image 10 is detected in the first mode, the HMD may change the first mode to the second mode. More specifically, when a first gaze of the user into a first gaze area of the augmented reality image 10 is detected in the first mode, the HMD may change the first mode to the second mode. Here, the first gaze area may be equal to the display area of the augmented reality image 10. In addition, the first gaze area may be greater than the display area of the augmented reality image 10. For example, the first gaze area may include the display area of the augmented reality image 10.

In addition, when the first gaze of the user into the first gaze area of the augmented reality image 10 is detected in the first mode, the HMD may acquire a first gaze holding period when the first gaze is held. If the first gaze holding period is equal to or greater than a first time period, the HMD may change the first mode to the second mode. If the first gaze holding period is less than the first time period, the HMD may retain the first mode. Accordingly, the HMD may not change the mode when the user glances at the augmented reality image 10. Here, the first time period may be set by the user, or may be set upon the fabrication of the HMD.

In addition, when a second gaze of the user into an external area of the first gaze area is detected in the second mode, the HMD may acquire a second gaze holding period when the second gaze is held. If the second gaze holding period is equal to or greater than a second time period, the HMD may change the second mode to the first mode again. If the second gaze holding period is less than the second time period, the HMD may retain the second mode. Accordingly, the HMD may provide the augmented reality image 10 which depends on the external device, when the gaze of the user deviates from the augmented reality image 10. Here, the second time period may be set by the user, or may be set upon the fabrication of the HMD.

Here, the first gaze holding period and the second gaze holding period may be different. The first gaze holding period may be greater than the second gaze holding period.

As shown in the right lower side of FIG. 3, the HMD may detect alignment between the augmented reality image 10 and the external device 200 in the second mode. More specifically, the HMD may detect the position change of the external device 100 in the second mode and detect alignment between the augmented reality image 10 and the external device 200 according to the position change of the external device 200. At this time, the HMD may detect the position change of the external device 200 from the image captured by the camera unit.

Alignment between the augmented reality image 10 and the external device 200 may be substantial alignment satisfying a predetermined condition. For example, when about 90% of the display area of the augmented reality image 10 overlaps the area of the external device 200, the HMD may detect alignment between the augmented reality image 10 and the external device 200.

In addition, when the augmented reality image 10 and the external device 200 are aligned in the second mode, the HMD may execute a function corresponding to the augmented reality image 10. The function corresponding to the augmented reality image 10 may mean a variety of functions associated with the HMD or the external device. For example, if the augmented reality image 10 corresponds to a message transfer function of the HMD, the HMD may execute the message transfer function when the augmented reality image 10 and the external device 200 are aligned in the second mode.

In addition, when the augmented reality image 10, the external device 200 and the gaze 20 of the user to the augmented reality image are aligned in the second mode, the HMD may execute a function corresponding to the augmented reality image 10. That is, the HMD may execute a function corresponding to the augmented reality image 10 if the gaze 20 of the user is further aligned.

In addition, when the augmented reality image 10 and the external device 200 are aligned during a predetermined time in the second mode, the HMD may execute a function corresponding to the augmented reality image 10. The HMD can prevent the function corresponding to the augmented reality image 10 from being executed regardless of user intention.

As shown in the left lower side of FIG. 3, when the function corresponding to the augmented reality image 10 is executed, the HMD may display an execution augmented reality image 30 for providing an execution screen of the function. For example, if the augmented reality image 10 corresponds to a message transfer function of the HMD, the HMD may display the execution augmented reality image 30 for providing a message transfer screen. At this time, the display position of the execution augmented reality image 30 may depend on the display position of the augmented reality image 10. That is, when the display position of the augmented reality image 10 is changed, the HMD may change the display position of the execution augmented reality image 30 based on the changed position of the augmented reality image 10.

FIGS. 4*a* and 4*b* are diagrams showing a method for executing a function corresponding to an augmented reality image according to alignment between the augmented reality image and an external device, at an HMD according to another embodiment of the present specification.

More specifically, FIGS. 4a and 4b show a method for, at the HMD, executing a function corresponding to the augmented reality image 10 when the augmented reality image 10 and a content image displayed on the external device 200 are aligned.

As shown in the left upper side of FIGS. 4a and 4b, the HMD may display the augmented reality image 10 as the first mode. For example, as shown in FIG. 4a, when the external device 200 is detected, the HMD may display the augmented reality image 10 on the periphery of the upper end of the external device 200. Here, as shown in FIG. 4b, the augmented reality image 20 may correspond to a selection function.

At this time, the external device 200 may display at least one content image. For example, as shown in FIG. 4a, the external device 200 may display a first content image 210 and a second content image 220. Here, the content image may include a video content image, a photo content image and an audio content image. For example, as shown in FIG. 4b, the first content image 210 may be a video content image and the second content image 220 may be a photo content image. The content image is not limited to the above-described embodiment.

As shown in the right upper side of FIGS. 4a and 4b, when the gaze 20 of the user to the augmented reality image 10 is detected in the first mode, the HMD may change the first mode to the second mode. This is equal to that described with reference to the right upper side of FIG. 3 and thus a description thereof will be omitted.

As shown in the right lower end of FIGS. 4a and 4b, the HMD may detect alignment between the augmented reality image 10 and any one of at least one content image displayed on the external device 200 in the second mode. For example, as shown, when a first content image 210 and a second content image 220 are displayed on the external device 200, the HMD may detect alignment between the augmented reality image 10 and any one of the first content image 210 and the second content image 220.

At this time, alignment between the augmented reality image 10 and the content image displayed on the external device 200 (hereinafter, referred to as the content image) may be substantial alignment satisfying a predetermined condition. For example, when about 90% of the display area of the augmented reality image 10 overlaps the display area of the content image, the HMD may detect alignment between the augmented reality image 10 and the content image.

When alignment between the augmented reality image 10 and the content image is detected, the HMD may execute a function corresponding to the augmented reality image 10. For example, as shown in FIG. 4a, when alignment between the augmented reality image 10 and the first content image 210 is detected, the HMD may execute a function corresponding to the augmented reality image 10. That is, as shown in FIG. 4b, when alignment between the augmented reality image 10 and the first content image 210 is detected, the HMD may execute a selection function corresponding to the augmented reality image 10.

As shown in the left lower side of FIGS. 4a and 4b, when the function corresponding to the augmented reality image 10 is executed, the HMD may display an execution augmented reality image 30 for providing an execution screen of the function. At this time, the HMD may display the execution augmented reality image 30 for providing the execution screen of the function, which is associated with the aligned content image. For example, as shown in FIG. 4b, if the augmented reality image 10 corresponds to the selection function and the first content image 210 is a video content image, the HMD may display the execution augmented reality image 30 for providing an execution screen for selecting and playing video content back. As another example, if the augmented reality image 10 corresponds to a message transfer function of the HMD and the first content image 210 is a photo content image, the HMD may display the execution augmented reality image 30 for providing a message transfer screen attached with a photo content image. At this time, the display position of the execution augmented reality image 30 may depend on the display position of the augmented reality image 10. That is, even when the position of the external device 200 is changed, the display position of the execution augmented reality image 30 may remain fixed.

FIG. 5 is a diagram showing a method for providing an execution screen of a function corresponding to an augmented reality image, at an HMD according to one embodiment of the present specification.

More specifically, FIG. 5 shows a method for, at the HMD, providing an execution screen of a function corresponding to the augmented reality image 10 as an execution augmented reality image 30 or as an execution image 40 displayed on the external device 200 according to settings.

As shown in the left of FIG. 5, when alignment between the augmented reality image 10 and the external device 200 is detected in the second mode, the HMD may execute a function corresponding to the augmented reality image 10. This is equal to that described in the right lower side of FIG. 3 and thus a detailed description thereof will be omitted.

As shown in the right upper side of FIG. 5, when the function corresponding to the augmented reality image 10 is executed, the HMD may display the execution augmented reality image 30 for providing the execution screen of the function. This is equal to that described in the left lower side of FIG. 3 and thus a detailed description thereof will be omitted.

As shown in the right upper side of FIG. 5, when the function corresponding to the augmented reality image 10 is executed, the HMD may control the external device 200 to display the execution image of the function on the display unit.

More specifically, when the function corresponding to the augmented reality image 10 is executed, the HMD may transmit control information for controlling the external device 200 to display the execution image 40 of the function to the external device 200 using a communication unit. In addition, the external device 200 may display the execution image 40 of the function corresponding to the augmented reality image 10 on the display unit of the external device 200 using the control information.

In addition, when the execution image 40 is displayed on the external device 200, the HMD may terminate display of the augmented reality image.

FIG. 6 is a diagram showing a method for displaying an augmented reality image when a function corresponding to an augmented reality image is terminated, at an HMD according to one embodiment of the present specification.

More specifically, the upper side of FIG. 6 shows a method for, at the HMD, displaying the augmented reality image 10 according function execution end when the execution augmented reality image 30 is displayed and the lower side of FIG. 6 shows a method for, at the HMD, displaying the augmented reality image 10 according to function execution end when the execution image 40 is displayed on the external device 200.

As shown in the left upper side of FIG. 6, when the execution augmented reality image 30 is displayed, the HMD may terminate display of the augmented reality image 10 when execution of the function corresponding to the augmented reality image 10 is terminated.

As shown in the right upper side of FIG. 6, when display of the execution augmented reality image 30 is terminated, the HMD may change the second mode to the first mode again.

As shown in the left lower side of FIG. 6, if the execution image 40 is displayed on the external device 200, the HMD may terminate display of the execution image 40 displayed on the external device 200 when execution of the function corresponding to the augmented reality image 10 is terminated. More specifically, when execution of the function is terminated, the HMD may transmit control information for terminating display of the execution image 40 displayed on the external device 200 to the external device 200 using the communication unit.

As shown in the left lower side of FIG. 6, when display of the execution image 40 on the external device is terminated, the HMD may display the augmented reality image 10 as the first mode again.

FIG. 7 is a diagram showing a method for displaying a gaze holding area, at an HMD according to one embodiment of the present specification.

As shown in the left upper side of FIG. 7, when the gaze 20 of the user into the first gaze area of the augmented reality image 10 is detected in the first mode, the HMD may change the first mode to the second mode. The first gaze area may be equal to the display area of the augmented reality image 10. This is equal to that described in the right upper side of FIG. 3 and thus a detailed description thereof will be omitted.

As shown in the right upper side of FIG. 7, the HMD may display the second gaze area 50 of the augmented reality image 10 when the mode is changed to the second mode. Here, the second gaze area 50 may mean a gaze holding area in which the second mode is held.

That is, as shown in the right lower side of FIG. 7, when the gaze 20 of the user into the second gaze area 50 is detected in the second mode, the HMD may retain the second mode. The second gaze area 50 may be wider than the first gaze area. For example, the second gaze area 50 may include the first gaze area.

As shown in the left lower side of FIG. 7, when the gaze 20 of the user into the external area of the second gaze area 50 is detected in the second mode, the HMD may change the second mode to the first mode again. When the second mode is changed to the first mode again, the HMD may terminate display of the second gaze area 50 of the augmented reality image 10.

FIG. 8 is a block diagram showing the configuration of an HMD according to one embodiment of the present specification. In FIG. 8, a detailed description of parts similar or equal to those of the HMD 800 shown in FIGS. 1 to 7 will be omitted.

Operations of the below-described processor 850 correspond to operations of the HMD 800 described above with reference to the figures. That is, in the present specification, the processor 850 is described as equating to the HMD.

Referring to FIG. 8, the HMD 800 may include a camera unit 810, a gaze detection unit 830, a communication unit 840 and a processor 850. Here, the communication unit 840 is optional.

The camera unit 810 may capture an image within an angle of view. In the present specification, the camera unit 810 may detect the external device. More specifically, the camera unit 810 may capture an image located in a front direction of the HMD 800 and deliver the captured image to the processor 850. At this time, the captured image may include the image of the external device. The processor 850 may detect the external device from the captured image.

The display unit 820 may display the image. In the present specification, the display unit 820 may display an augmented reality image. In the present specification, the augmented reality image may be a virtual image associated with an external device or the HMD.

The gaze detection unit 830 may detect a gaze of a user. More specifically, the gaze detection unit 830 may detect the gaze of the user and deliver the detected result to the processor 850. In addition, the gaze detection unit 830 may detect gaze change of the user. At this time, the gaze detection unit 830 may be a rear camera unit 810 provided on a rear surface of the HMD 800 to capture a gaze image. This is only an example of the gaze detection unit 830 and the HMD 800 of the present specification is not limited to the embodiment.

The communication unit 840 may communicate with the external device. In the present specification, the communication unit 840 may pair the HMD 800 with the external device. Pairing may mean wired/wireless connection between the HMD 800 and the external device. The method for connecting the HMD 800 and the external device by wire or wirelessly is not limited.

In the present specification, the communication unit 840 may transmit control information for displaying an execution image on the external device or for terminating display of the execution image to the external device.

The processor 850 may control at least one unit included in the HMD 800. More specifically, the processor 850 may control the above-described units and control data transmission and/or reception between the units.

In the present specification, the processor 850 may detect the external device, as described with reference to FIG. 1. The processor 850 may detect the external device using the camera unit 810. In addition, the processor 850 may detect position change of the external device using the camera unit 810. More specifically, the processor 850 may detect the external device and position change of the external device from the image captured by the camera unit 810.

The processor 850 may display the augmented reality image as the first mode or the second mode as described with reference to FIG. 2. In the first mode, the display position of the augmented reality image may depend on the position of the external device. That is, the first mode may mean a mode in which, when the position of the external device is changed, the display position of the augmented reality image is changed based on the changed position of the external device. The second mode may mean a mode in which, even when the position of the external device is changed, the display position of the augmented reality image remains fixed. At this time, in the second mode, the processor 850 may fix the augmented reality image in the display area of the HMD 800. In addition, in the second mode, the processor 850 may fix the augmented reality image in a peripheral space of the HMD 800.

In addition, as described with reference to the right upper side of FIG. 3, when the gaze of the user into the augmented reality image is detected in the first mode, the processor 850 may change the first mode to the second mode. More specifically, when a first gaze of the user into the first gaze area of the augmented reality image is detected in the first mode, the processor 850 may change the first mode to the second mode. Here, the first gaze area may be equal to the display area of the augmented reality image. In addition, the first gaze area may be greater than the display area of the augmented reality image.

In addition, as described with reference to the right lower side of FIG. 3, the processor 850 may detect alignment between the augmented reality image and the external image in the second mode. More specifically, the processor 850 may detect position change of the external device in the second mode and detect alignment between the augmented reality image and the external device according to position change of the external device.

In addition, as described with reference to the right lower side of FIGS. 4a and 4b, the processor 850 may detect alignment between the augmented reality image and any one of at least one content image displayed on the external device in the second mode.

In addition, as described with reference to the left of FIG. 5, when alignment between the augmented reality image and the external device is detected in the second mode or the alignment between the augmented reality image and the external content image is detected, the processor 850 may execute the function corresponding to the augmented reality image. In addition, as described with reference to the right upper side of FIG. 5, when the function corresponding to the augmented reality image is executed, the processor 850 may display the execution augmented reality image for providing the execution screen of the function. In addition, as described with reference to the right lower side of FIG. 5, when the function corresponding to the augmented reality image is executed, the processor 850 may control the external device to display the execution image of the function on the display unit 820.

As described with reference to FIG. 6, when the execution of the function corresponding to the augmented reality image terminates, the processor 850 may terminate display of the execution augmented reality image or the execution image.

FIG. 9 is a flowchart illustrating a method for controlling an HMD according to one embodiment of the present specification. In this flowchart, a detailed description of parts similar or equal to those shown in FIGS. 1 to 8 will be omitted.

Referring to FIG. 9, the HMD may display the augmented reality image as the first mode. The first mode may mean a mode in which the display position of the augmented reality image depends on the position of the external device. That is, in the first mode, when the position of the external device is changed, the display position of the augmented reality image is changed based on the changed position of the external device. Accordingly, the HMD can provide the user with the augmented reality image moved together with the external device.

According to one embodiment, the HMD may display the augmented reality image in the first mode when the external device is detected (S910). According to another embodiment, the HMD may display the augmented reality image in the first mode when the gaze of the user into the external device is detected.

Next, the HMD may determine whether the gaze of the user to the augmented reality image is detected in the first mode (S920). According to one embodiment, the HMD may detect whether the first gaze of the user into the first gaze area of the augmented reality image is detected in the first mode. Here, the first gaze area may be equal to the display area of the augmented reality image. In addition, the first gaze area may be greater than the display area of the augmented reality image. For example, the first gaze area may include the display area of the augmented reality image.

Next, when the gaze of the user to the augmented reality image is detected in the first mode, the HMD may change the first mode to the second mode (S930). More specifically, when the first gaze of the user into the first gaze area of the augmented reality image is detected in the first mode, the HMD may change the first mode to the second mode. The first gaze area may be equal to the display area of the augmented reality image. In addition, the first gaze area may be greater than the display area of the augmented reality image.

The second mode may mean a mode in which, even when the position of the external device is changed, the display position of the augmented reality image remains fixed. Accordingly, the HMD can provide the user with the augmented reality image which is independent of the external device.

When the first gaze of the user into the first gaze area of the augmented reality image is detected in the first mode, the HMD may acquire the first gaze holding period when the first gaze is held. If the first gaze holding period is equal to or greater than a first time period, the HMD may change the first mode to the second mode. If the first gaze holding period is less than the first time period, the HMD may retain the first mode. Accordingly, the HMD may not change the mode when the user glances at the augmented reality image.

When the second gaze of the user into the external area of the first gaze area is detected in the second mode, the HMD may acquire the second gaze holding period when the second gaze is held. If the second gaze holding period is equal to or greater than a second period, the HMD may change the second mode to the first mode again. If the second gaze holding period is less than the second time period, the HMD may retain the second mode. Accordingly, the HMD may provide the augmented reality image which depends on the external device, when the gaze of the user deviates from the augmented reality image.

The first gaze holding period and the second gaze holding period may be different. The first gaze holding period may be greater than the second gaze holding period.

Next, the HMD may detect alignment between the augmented reality image and the external device in the second mode (S940). More specifically, the HMD may detect the position change of the external device in the second mode and detect alignment between the augmented reality image and the external device according to the position change of the external device. At this time, the HMD may detect the position change of the external device from the image captured by the camera unit. Alignment between the augmented reality image and the external device may be substantial alignment satisfying a predetermined condition. For example, when about 90% of the display area of the augmented reality image overlaps the area of the external device, the HMD may detect alignment between the augmented reality image and the external device. This is equal to that described with reference to FIG. 3.

When the external device displays at least one content image, the HMD may detect alignment between the augmented reality image and any one of at least one content image displayed on the external device in the second mode. At this time, alignment between the augmented reality image and the content image displayed on the external device (hereinafter, referred to as the content image) may be substantial alignment satisfying a predetermined condition. For example, when about 90% of the display area of the augmented reality image overlaps the display area of the content image, the HMD may detect alignment between the augmented reality image and the content image. This is equal to that described with reference to FIGS. 4a and 4b.

Next, when the augmented reality image and the external image are aligned in the second mode, the function corresponding to the augmented reality image may be executed (S950). In addition, when the function corresponding to the augmented reality image is executed, the HMD may display the execution augmented reality image for providing the execution screen of the function. At this time, the display position of the execution augmented reality image may depend on the display position of the augmented reality image. This is equal to that described with reference to FIG. 3.

If the external device displays at least one content image, the HMD may execute the function corresponding to the augmented reality image when the augmented reality image and the content image are aligned in the second mode. This is equal to that described with reference to FIGS. 4a and 4b.

Although the preferred embodiments of the present specification have been disclosed for illustrative purposes, those skilled in the art will appreciate that various modifications, additions and substitutions are possible, without departing from the scope and spirit of the specification as disclosed in the accompanying claims. Such modifications should not be individually understood from the technical spirit or prospect of the present specification.

The HMD and the method for controlling the same of the present specification may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a magnetic tape, a floppy disk, an optical data storage, and a carrier wave (e.g., data transmission over the Internet). The processor-readable recording medium can be distributed over a plurality of computer systems connected to a network so that processor-readable code is written thereto and executed therefrom in a decentralized manner.

In the present specification, the terms "angle", "distance" and "direction" may indicate an accurate angle, distance and direction or include a substantial angle, distance and direction of a predetermined range, respectively. That is, the angle, distance and direction of the present specification may indicate a substantial angle, distance and direction with errors.

Both apparatus and method inventions are mentioned in this specification and descriptions of both of the apparatus and method inventions may be complementarily applicable to each other.

It will be apparent to those skilled in the art that various modifications and variations can be made in the present specification without departing from the spirit or scope of the specifications. Thus, it is intended that the present specification covers the modifications and variations of this specification provided they come within the scope of the appended claims and their equivalents.

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As described above, the present invention is totally or partially applicable to electronic devices.

The invention claimed is:

1. A head mounted display (HMD) comprising:
   a display unit configured to display an augmented reality image;
   a communication unit configured to communicate with an external device;
   a gaze detection unit configured to detect a gaze of a user; and
   a processor configured to:
   execute a function corresponding to the augmented reality image when the augmented reality image and the external device are aligned in a first mode, wherein the first mode is a mode in which a display position of the augmented reality image remains fixed even when a position of the external device is changed, and
   transmit control information for displaying an execution image of the function to the external device.

2. The HMD according to claim 1, wherein the processor is configured to:
   change the first mode to a second mode when the gaze of the user to the augmented reality image is detected in the second mode, wherein the second mode is a mode in which the display position of the augmented reality image depends on the position of the external device, and
   display the augmented reality image as the first mode.

3. The HMD according to claim 2, wherein the processor is configured to display the augmented reality image as the second mode when display of the execution image on the external device is terminated.

4. The HMD according to claim 2, wherein the processor is configured to display the augmented reality image as the second mode when the gaze of the user to the external device is detected.

5. The HMD according to claim 2, wherein the processor is further configured to display a first gaze area of the augmented reality image in the first mode.

6. The HMD according to claim 5, wherein the processor is further configured to:
   retain the first mode when the gaze of the user to the first gaze area is detected in the second mode, and
   change the first mode to the second mode when the gaze of the user to the external area of the first gaze area is detected in the first mode.

7. The HMD according to claim 5, wherein the processor is further configured to:
   when a second gaze of the user into an external area of the first gaze area is detected in the first mode, acquire a first gaze holding period when the second gaze is held,
   change the first mode to the second mode again when the first gaze holding period is greater than or equal to a first time period, and
   retain the first mode when the first gaze holding period is less than the first time period.

8. The HMD according to claim 7, wherein the processor is configured to:

when a second gaze of the user to a second gaze area of the augmented reality image is detected in the second mode, acquire a second gaze holding period when the second gaze is held, change the second mode to the first mode when the second gaze holding period is greater than or equal to a second time period, and retain the second mode when the second gaze holding period is less than the second time period.

9. The HMD according to claim 8, wherein the first gaze holding period and the second gaze holding period are different.

10. The HMD according to claim 8, wherein the second gaze holding period is greater than the first gaze holding period.

11. The HMD according to claim 8, wherein the first gaze area is wider than the second gaze area.

12. The HMD according to claim 5, wherein the processor is further configured to terminate display of the first gaze area when the first mode is changed to the second mode.

13. The HMD according to claim 1, wherein the processor is configured to transmit control information for terminating display of the execution image when execution of the function is terminated.

14. The HMD according to claim 1, wherein the processor is configured to display an execution augmented reality image for providing an execution screen of the function when the function corresponding to the augmented reality image is executed.

15. The HMD according to claim 14, wherein the display position of the execution augmented reality image depends on the display position of the augmented reality image.

16. The HMD according to claim 14, wherein the execution screen of the function corresponds to an execution screen of the function, associated with the aligned content image.

17. The HMD according to claim 1, wherein the processor is configured to terminate display of the augmented reality image when the execution image is displayed on the external device.

18. The HMD according to claim 1, wherein the processor is configured to execute the function corresponding to the augmented reality image when the augmented reality image, the external device and the gaze of the user to the augmented reality image are aligned in the first mode.

19. The HMD according to claim 1, wherein the processor is configured to execute the function corresponding to the augmented reality image when the augmented reality image and the external device are aligned in the first mode during a predetermined period.

20. A method for controlling a head mounted display (HMD), the method comprising:

displaying an augmented reality image on a display unit of the HMD;

executing, via a processor of the HMD, a function corresponding to the augmented reality image when the augmented reality image and an external device are aligned in a first mode, wherein the first mode is a mode in which a display position of the augmented reality image remains fixed even when a position of the external device is changed; and transmitting, via a communication of the HMD, control information for displaying an execution image of the function to the external device.

* * * * *